United States Patent
Tsujimoto (10) Patent No.: US 6,741,838 B2
(45) Date of Patent: May 25, 2004

(54) METHOD AND DEVICE FOR DIVERSITY TRANSMISSION/RECEPTION

(75) Inventor: Ichiro Tsujimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 551 days.

(21) Appl. No.: 09/736,427

(22) Filed: Dec. 15, 2000

(65) Prior Publication Data

US 2001/0004585 A1 Jun. 21, 2001

(30) Foreign Application Priority Data

Dec. 15, 1999 (JP) .............................. 11-356020

(51) Int. Cl.$^7$ .............................. H03C 7/02; H04B 1/02
(52) U.S. Cl. .................... 455/101; 455/103; 455/138; 455/273
(58) Field of Search .................. 455/101, 102, 455/103, 118, 132, 133, 137, 277.1, 272, 273, 232.1, 234.1, 138; 375/299, 347

(56) References Cited

U.S. PATENT DOCUMENTS 4,723,321 A * 2/1988 Saleh ........................ 455/295

5,335,359 A * 8/1994 Tsujimoto et al. .......... 455/506

FOREIGN PATENT DOCUMENTS

JP 59-105727 6/1984

* cited by examiner

Primary Examiner—Quochien B. Vuong
(74) Attorney, Agent, or Firm—Whitham, Curtis & Christofferson, PC (57) ABSTRACT

A transmission side device combines two independent transmission signals (S1, S2) together to produce two combined signals, i.e., a sum signal (S1+S2) and a difference signal (S1−S2), and transmits the produced signals over two radio wave propagation paths, respectively. After the sum signal and the difference signal are received by the reception side device, the sum signal and the difference signal, as received, are subjected to an AGC control operation and a complex-level multiplication operation with a weighting coefficient based on correlation control, and then separated into two, restored, independent signals.

14 Claims, 6 Drawing Sheets

METHOD AND DEVICE FOR DIVERSITY TRANSMISSION/RECEPTION

CROSS REFERENCE TO RELATED APPLICATIONS

The present invention claims priority from Japanese Patent Application No. 11-356020 filed Dec. 15, 1999, the contents of which are incorporated herein by reference.

BACKGROUND OF THE INVENTION

1. Field of the Invention

The present invention relates to radio communications, and particularly to radio communications in which the conditions of radio wave propagation vary over time. More particularly, the present invention relates to a diversity technique for use in interoffice radio communications, inter-building communications, or satellite communications, in which temporal variations in radio wave propagation characteristics due to fading are not substantial.

2. Description of Related Art

In line-of-sight point-to-point communications using micro waves or millimeter waves, space diversity communication systems are widely used as effective means for avoiding temporal variations in radio wave propagation characteristics due to fading. Also in mobile communications such as portable telephones, diversity communication systems are widely used in order to avoid temporal variations in radio wave propagation characteristics due to multipath fading. In these conventional diversity communication systems, the transmission side device defines two radio wave propagation paths for carrying one transmission signal, and the reception side device uses two independent receivers for receiving the transmitted signals via the two radio wave propagation paths, respectively, thereby obtaining two reception outputs. Then, the two reception outputs are diversity-combined with each other. Diversity maximum ratio combining is a known technique used for combining the reception outputs together.

Figure 6:
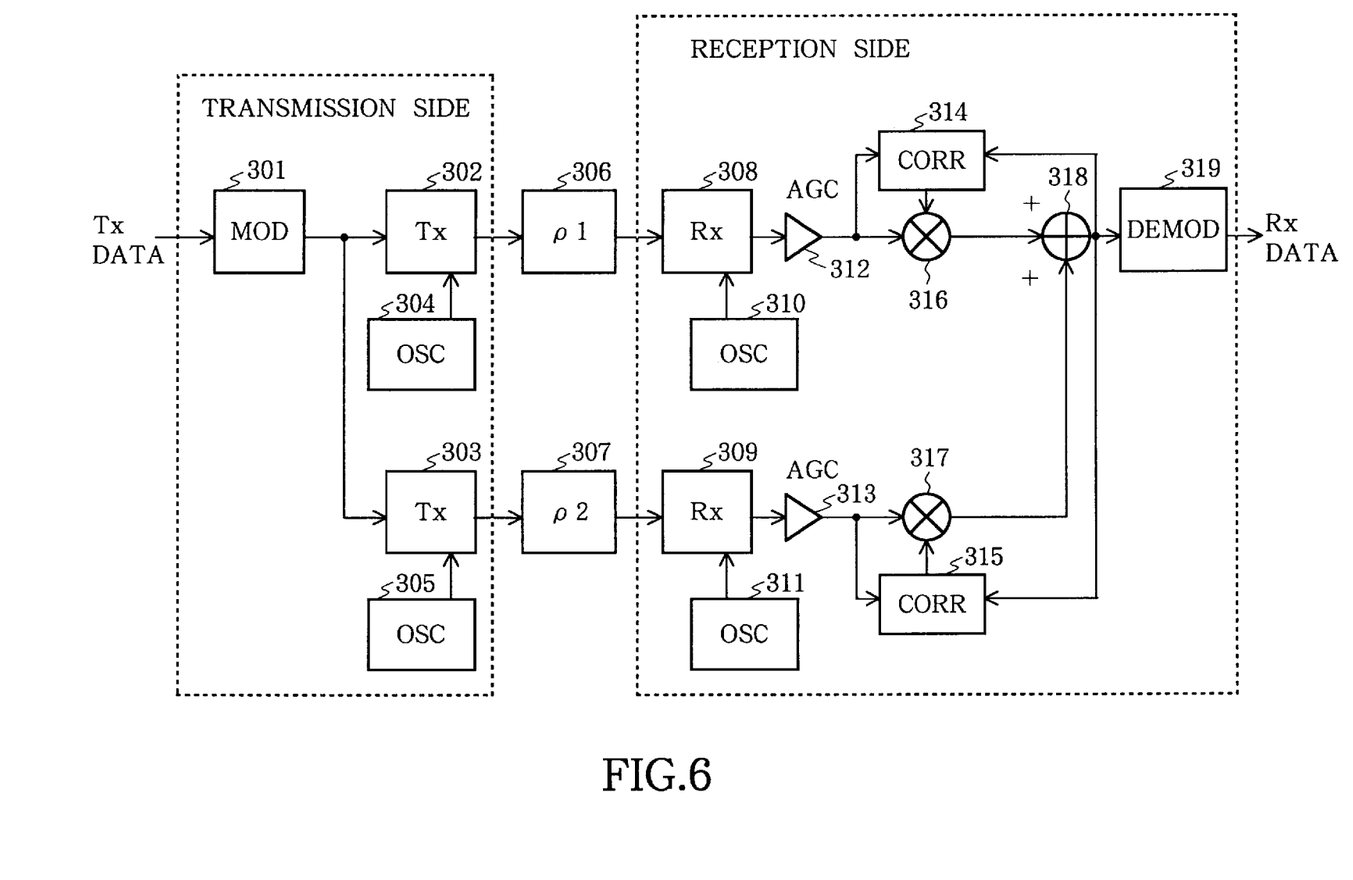
FIG. 6 is a block diagram illustrating a conventional example.

FIG. 6 is a block diagram illustrating a conventional device for use in such systems. Single transmission data is provided to a modulator 301 of the transmission side device. The modulated output signal diverges into two signals of the same information, which are then input to two independent transmitters 302 and 303, respectively. Local oscillators 304 and 305 provide carrier frequencies to the two transmitters 302 and 303, respectively, for frequency conversion of the two signals. The signals are then transmitted to two propagation paths 306 and 307.

The signals from the two propagation paths 306 and 307 are received by receivers 308 and 309, respectively, in the reception side device. Local oscillators 310 and 311 provide carrier frequencies to the receivers 308 and 309, respectively, for frequency de-conversion of the received signals. The signals are then subjected to a gain adjustment process by two automatic gain controllers (AGCs) 312 and 313, respectively. The outputs from the automatic gain controllers are subjected to a multiplication operation by complex multipliers 316 and 317 with a weighting coefficient which is calculated by correlation control circuits 314 and 315, respectively. The two output signals are added together by an addition circuit 318 into a single signal. Each of the two correlation control circuits 314 and 315 generates the weighting coefficient based on the output from the addition circuit 318 so that the output signal from the addition circuit 318 will have an amplitude that is in proportion to the square of each of the signals received via the two propagation paths and be in phase with the received signals. Thus, a diversity maximum ratio combining operation is performed, and reception data corresponding to the transmission data is obtained by a demodulator 319.

For example, JP S59-105727A describes a reception side structure for diversity communications based on maximum ratio combining.

However, with the conventional diversity communication systems as described above, while two independent radio wave propagation paths are occupied, the total signal transmission capacity is equivalent to that achieved by a system which uses only one radio wave propagation path. Thus, the radio wave resources are not efficiently used except when the characteristics of one of the radio wave propagation paths has degraded to a point where the path is substantially unusable.

The hardware resources of the transmitter/receiver are also not used efficiently. Specifically, while each of the transmission side device and the reception side device is provided with two independent sets of hardware equipment, only a single signal can be transmitted between the transmission side and the reception side.

SUMMARY OF THE INVENTION

The present invention has been made in view of such circumstances in the prior art, and it is an object of the present invention to provide a diversity communication system with which the signal transmission capacity can be increased if the quality of the propagation paths is kept at a certain level. It is another object of the present invention to provide a diversity communication device with which two different signals can be transmitted while providing diversity maximum ratio combining for each of the signals, as long as each of the two independent propagation paths maintains a certain level of quality. It is a further object of the present invention to improve the efficiency of use of radio wave resources and hardware resources.

In order to achieve these objects, according to the present invention, the transmission side device combines together two transmission signals independent of each other so as to produce two combined signals which are vector-wise in a mirror image relationship with respect to each other, and transmits the two combined signals over two propagation paths, respectively. The reception side device receives the combined signals (or "reception signals") and restores the two independent transmission signals therefrom, based on the mirror image relationship between the reception signals, by eliminating one of the transmission signals from one of the reception signals and eliminating the other one of the transmission signals from the other one of the reception signals.

In other words, the present invention is based on a principle that if two transmission signals (i.e., a first transmission signal and a second transmission signal) are combined together to produce two reception signals to be transmitted over two propagation paths, respectively, so that the produced reception signals are in a mirror image relationship (i.e., so that the second transmission signal, for example, in one reception signal has a vector which is oppositely oriented with respect to that of the second transmission signal in the other reception signal with the vector of the first transmission signal of one reception signal being aligned with that of the first transmission signal of the other reception signal), then, the second transmission signal can be eliminated on the reception side by using the two reception signals. Based on such a principle, the transmission side device combines two transmission signals together so that the obtained reception signals are vector-wise in a mirror image relationship with respect to each other, and transmits the obtained reception signals. The reception side device restores each transmission signal by eliminating the other transmission signal which has been superimposed on the transmission signal to be restored. In this way, the present invention realizes a transmission capacity that is up to twice as much as that achieved by conventional diversity communication systems.

Specifically, according to the present invention, the transmission side device combines two independent transmission signals (S1, S2) together to produce two combined signals, i.e., a sum signal (S1+S2) and a difference signal (S1−S2), and transmits the produced signals over two propagation paths, respectively. After the sum signal and the difference signal are received by the reception side device, the sum signal and the difference signal, as received, are subjected to an AGC control operation and a complex-level multiplication operation with a weighting coefficient based on correlation control, and then separated into two, restored, independent signals.

More specifically, the present invention provides a diversity transmission/reception device, comprising a transmission side device and a reception side device, the transmission side device comprising: addition means for receiving two transmission signals (S1 and S2) independent of each other to produce an output signal (S1+S2); subtraction means for receiving the two transmission signals (S1 and S2) independent of each other to produce an output signal (S1−S2); first transmission means for diversity-transmitting the output signal (S1+S2) from the addition means to a first propagation path as a first reception signal; and second transmission means for diversity-transmitting the output signal (S1−S2) from the subtraction means to a second propagation path as a second reception signal, and the reception side device comprising: first and second reception means for receiving the first and second reception signals which have passed through the first and second propagation paths, respectively; first and second automatic gain controlling means for receiving, as their inputs, the outputs from the first and second reception means, respectively; first and second multiplication means for subjecting the output signals from the first and second automatic gain controlling means to complex multiplication with weighting coefficients (W1 and W2) so as to produce output signals (x1 and x2), respectively; addition means and subtraction means receiving, as their inputs, the output signals (x1 and x2) from the first and second multiplication means so as to produce outputs (y1=x1+x2) and (y2=x1−x2), respectively; first correlation control means for performing a correlation operation between a first input and a second input, the first input being the output (y1=x1+x2) from the addition means and the second input being the output from the first automatic gain controlling means, so as to provide the weighting coefficient (W1) to the first multiplication means; and second correlation control means for performing a correlation operation between a first input and a second input, the first input being the output (y2=x1−x2) from the subtraction means and the second input being the output from the second automatic gain controlling means, so as to provide the weighting coefficient (W2) to the second multiplication means.

With such a structure, as long as each of the two propagation paths maintains reasonable transmission characteristics, it is possible to obtain diversity effects deriving from the use of two propagation paths, and to increase the transmission capacity by a factor of up to two, thereby improving the efficiency of use of radio wave frequency resources and hardware resources.

In the present invention, the two transmission signals (S1 and S2) independent of each other can be signals which are obtained by modulating two carrier waves of the same frequency whose phases are shifted from each other by about $\pi/2$. Thus, when carrier waves are modulated respectively by two modulators with two input transmission data signals, it is preferred that the two modulators have the same carrier frequency and phases that are shifted from each other by about $\pi/2$. The phrase "about $\pi/2$" as used herein means that the phase difference does not need to be exactly $\pi/2$, but some deviation in phase is acceptable as long as the diversity operation of the present invention can be performed.

Such a structure enables the reception side device to perform a diversity maximum ratio combining process. Moreover, with such a structure, two independent propagation paths can be used for two phase-multiplexed signals. As a result of the phase multiplexing, an extra room available for the transmission of more information is created in the transmission band which would otherwise be fully occupied. Such an extra capacity can be used for realizing diversity effects.

The first and second correlation control means may comprise means for calculating the weighting coefficients (W1 and W2), respectively, so that each of the output (y1) from the addition means and the output (y2) from the subtraction means of the reception side device has an amplitude in proportion to the square of a respective one of the first and second reception signals and is in phase with the reception signal.

Most suitably, the gains of the first and second automatic gain controlling means are in proportion to $1/|\rho1|$ and $1/|\rho2|$, respectively (where $\rho1$ and $\rho2$, each being a complex number, denote attenuation coefficients of the first and second propagation paths, respectively), while the weighting coefficients (W1 and W2) are $W1=k1\rho1^*/|\rho1|$ and $W2=k2\rho2^*/|\rho2|$, respectively (where k1 and k2 denote proportional constants, and $\rho1^*$ and $\rho2^*$ denote complex conjugates of $\rho1$ and $\rho2$, respectively).

Alternatively, the first and second reception signals which have been demodulated by demodulation means may be re-modulated to produce re-modulated signals, so as to provide the re-modulated signals, instead of the outputs from the addition means and the subtraction means, to the first and second correlation control means, respectively, as their reference signals. In such a case, receiver noise, or the like, is not contained in the reference signals which are provided for the correlation calculation, whereby it is possible to perform an accurate correlation operation.

Alternatively, preamble signals from preamble signal generation means may be provided, instead of the outputs from the addition means and the subtraction means, to the first and second correlation control means, respectively, as their reference signals. Alternatively, preamble signals extracted form the respective outputs from the first and second automatic gain controlling means may be provided to the first and second correlation control means, respectively, for the correlation operation.

Also in such cases, it is possible to perform an accurate correlation operation because the operation would not then be influenced by receiver noise, or the like.

It is preferred to provide means for monitoring characteristics of the propagation paths, so that when a quality of one of the propagation paths has degraded thereby reducing the reception signal level to a point where the reception signal can no longer be reproduced, the monitoring means can instruct the transmission side device to stop the transmission signal combining operation, thereby stopping the transmission signal combining operation on the transmission side. Thus, even if the reception signal level significantly decreases for one propagation path, for example, it is possible to avoid situations where neither of the transmission signals can be restored.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

First Embodiment

Figure 1:
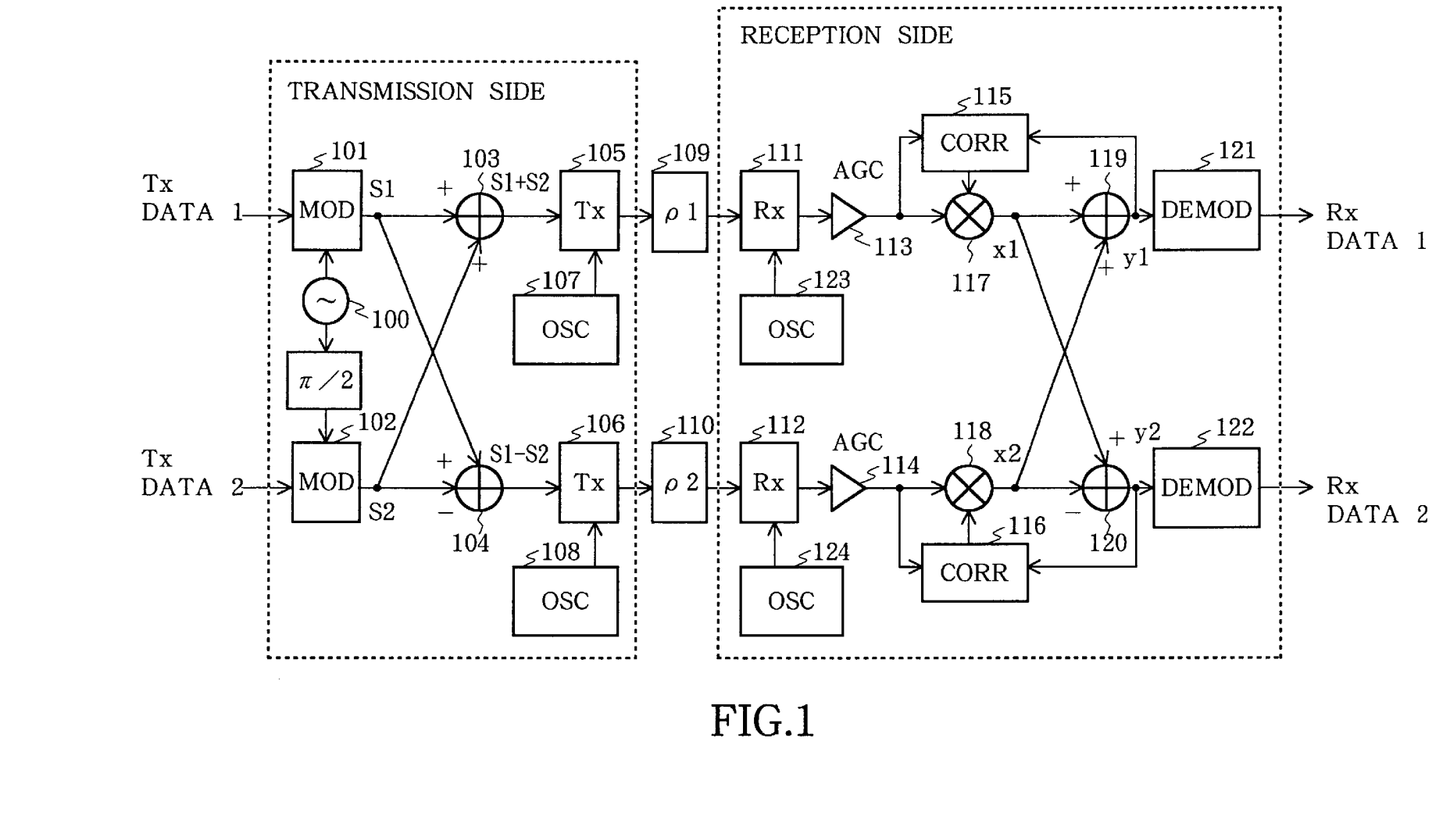
FIG. 1 is a block diagram illustrating a device according to the first embodiment of the present invention.

FIG. 1 is a block diagram illustrating a device according to the first embodiment of the present invention. First, the general structure will be described. From the left side of FIG. 1, two transmission data (transmission data 1 and transmission data 2) are input to the transmission side device. The transmission side device and the reception side device are coupled to each other by two independent radio wave propagation paths 109 and 110. Two reception data (reception data 1 and reception data 2) are obtained from the outputs of the reception side device. One of the transmission side device and the reception side device is a radio communication device for line-of-sight communications, for example. The propagation characteristics of the two independent radio wave propagation paths (hereinafter, referred to as "propagation paths") 109 and 110 vary over time due to variations in propagation conditions. A diversity system is employed in order to address such temporal variations.

The transmission side device includes two modulators 101 and 102 for independently modulating carrier signals with the transmission data 1 and the transmission data 2, respectively. Carrier signals, originating from a single carrier generator 100, whose phases are shifted from each other by $\pi/2$ are provided to the two modulators 101 and 102, respectively.

The respective output signals from the modulators 101 and 102 are two independent intermediate-frequency transmission signals (S1, S2). An adder 103 and a subtracter 104 are provided, each receiving these transmission signals. The respective output signals ((S1+S2) and (S1−S2)) from the adder 103 and the subtracter 104 are provided to two separate transmission means. The two transmission means include transmitters 105 and 106, respectively. The two transmission means also include two independent local oscillators 107 and 108 for providing frequency signals to the transmitters 105 and 106, respectively. The respective output signals from these transmission means are diversity-transmitted to the two propagation paths 109 and 110, respectively.

The reception side device includes two separate reception means for receiving reception signals coming from the propagation paths 109 and 110, respectively. The two reception means include receivers 111 and 112. The two reception means also include two independent local oscillators 123 and 124 for providing frequency signals to the receivers 111 and 112, respectively. Two automatic gain controllers (AGCs) 113 and 114 are provided which receive, as their inputs, the outputs from the two reception means, respectively. Two multipliers 117 and 118 are provided for performing a complex multiplication operation between the output signals from the two automatic gain controllers and weighting coefficients (W1, W2), respectively. An adder 119 and a subtracter 120 are provided, each receiving the output signals (x1, x2) from the two multipliers. Two correlation control circuits 115 and 116 are provided. The correlation control circuits 115 and 116 each perform a correlation operation and provide the weighting coefficients (W1, W2) to the two multipliers 117 and 118, respectively, while receiving, as their first inputs, the output (y1=x1+x2) from the adder 119 and the output (y2=x1−x2) from the subtracter 120, respectively, and as their second inputs, the outputs from the two automatic gain controllers.

The output (y1) from the adder 119 is demodulated by a demodulator 121 into the reception data 1, and the output (y2) from the subtracter 120 is demodulated by another demodulator 122 into the reception data 2.

The output (S1+S2) from the adder 103 of the transmission side device is transmitted to the propagation path 109 after the frequency thereof is converted by the transmission means into a radio frequency. The output (S1−S2) from the subtracter 104 is transmitted to the propagation path 110 after the frequency thereof is converted by the transmission means into a radio frequency. In this example, the propagation paths 109 and 110 are independent of each other, with the transmission coefficients of the two propagation paths 109 and 110 being $\rho 1$ and $\rho 2$, respectively. Hereinafter, the propagation path 109 and the propagation path 110 will be referred to also as the "branch 1" and the "branch 2", respectively.

The frequencies of the signals received by the reception side device are converted by the receivers 111 and 112 into intermediate frequencies. These signals are reception signals corresponding to the transmission signals (S1+S2) and (S1−S2), respectively, and the two reception signals are normalized for their signal levels by the automatic gain controllers 113 and 114, respectively.

Figure 2:
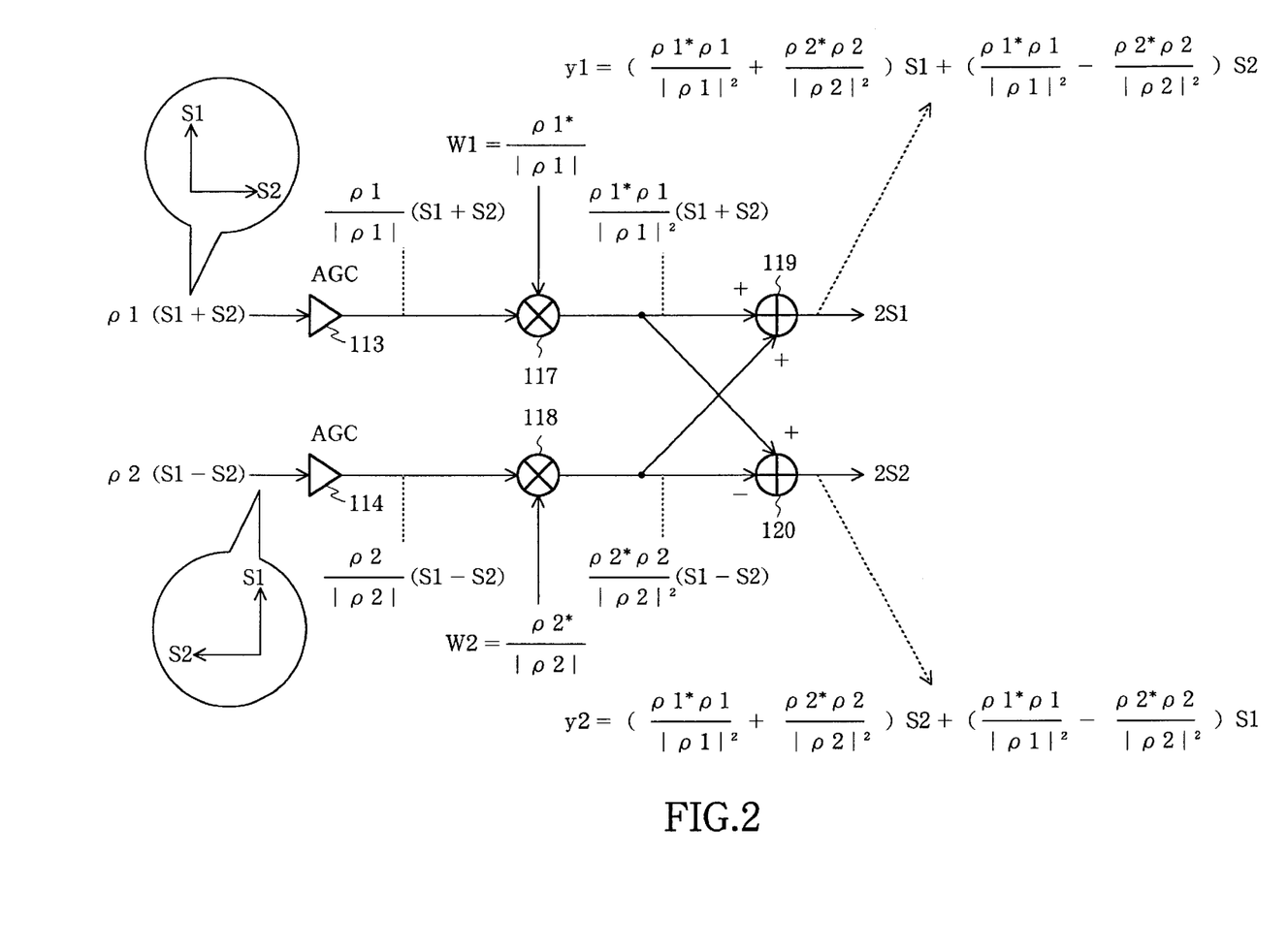
FIG. 2 is a diagram illustrating an operation of a diversity control of a device according to the first embodiment of the present invention.

Next, the operation principle for the diversity operation of the device according to the present embodiment will be described with reference to FIG. 2. FIG. 2 illustrates the two signal paths in the reception side device from the automatic gain controllers to the demodulators. On the transmission side, the transmission signal on the upper signal path is (S1+S2). The transmission signal passes along the propagation path, where the transmission signal is multiplied by the transmission coefficient c $\rho 1$ of the propagation path. As a result, on the left side of FIG. 2, the input signal to the automatic gain controller 113 is $\rho 1(S1+S2)$. On the other hand, the transmission signal on the lower signal path is (S1−S2), whereby the input signal to the automatic gain controller 114 is $\rho 2(S1-S2)$. These relationships are illustrated in FIG. 2 in the form of signal vector diagrams. The orthogonal relationships between the signal S1 and the signal S2 are not the same for the two signal paths, but are in a mirror image relationship.

The automatic gain controller of each signal path normalizes the reception signal carrier level. Thus, the gain of the automatic gain controller 113 on the upper signal path is $1/|\rho1|$, and the gain of the automatic gain controller 114 on the lower signal path is $1/|\rho2|$.

The output from each of the automatic gain controllers is multiplied by the complex multiplier with a weighting coefficient. The weighting coefficients (W1, W2) of the respective signal paths are calculated by the correlation control circuits 115 and 116, respectively, as described above with reference to FIG. 1. Thus, the correlation control circuit 115 on the upper signal path calculates the correlation between the output from the adder 119 and the input to the multiplier 117. The correlation control circuit 116 on the lower signal path calculates the correlation between the output from the subtracter 120 and the input to the multiplier 118. The output from each of the adder 119 and the subtracter 120 is a signal containing S1 or S2. Assuming that the output from the adder 119 contains S1, the correlation control circuit 115 performs the following operation:

$$W1=E[conj\{(\rho1/|\rho1|)\cdot(S1+S2)\}\cdot S1]=(\rho1^*/|\rho2|)conj\{S1\}\cdot S1=\rho1^*/|\rho1|$$

where "conj{}" denotes a complex conjugate, and "E[]" denotes an expected value (time average).

Similarly, the correlation control circuit 116 performs the following operation:

$$W2=\rho2^*/|\rho2|$$

where each of $\rho1^*$ and $\rho2^*$ is a simplified expression of the complex conjugate symbol "conj{}" for $\rho1$ and $\rho2$, respectively.

The complex multipliers 117 and 118 multiply the respective signals with these weighting coefficients. As a result, the output signal from the adder 119 is as follows:

$$y1=(\rho1^*\rho1/|\rho1|^2+\rho2^*\rho2/|\rho2|^2)S1+(\rho1^*\rho1/|\rho1|^2-\rho2^*\rho2/|\rho2|^2)S2$$

The output signal from the subtracter 120 is as follows:

$$y2=(\rho1^*\rho1/|\rho1|^2+\rho2^*\rho2/|\rho2|^2)S2+(\rho1^*\rho1/|\rho1|^2-\rho2^*\rho2/|\rho2|^2)S1$$

Both of $$\rho1^*\rho1/|\rho1|^2 \text{ and } \rho2^*\rho2/|\rho2|^2$$

are real numbers because their numerators are both a product of complex conjugates. Moreover, since they have been each normalized by the square of the amplitude, they are both equal to a real number, 1. Thus, performing such operations is equivalent to performing an amplitude/phase control on each of the received signals so that the amplitude of the obtained signal is in proportion to the square of the received signal and that the obtained signal is in phase with the received signal with respect to the real number axis. Thus, the maximum ratio combining (MRC, or "maximally diversity combining") is performed on y1 with respect to S1 and on y2 with respect to S2.

Therefore, on the upper signal path, the signal S2 component is in reverse phase and is thus canceled at the output of the adder 119, whereby the output signal component is 2S1. Similarly, on the lower signal path, the signal component of the output from the subtracter 120 is 2S2. This operation can be readily understood from the fact that when the two vector diagrams shown in FIG. 2 are combined together so that the signals are in phase with each other with respect to S1, then the S2 components, being in reverse phase with each other, are canceled by each other. Similarly, when the two vector diagrams are combined together so that the signals are in phase with each other with respect to the signal S2, the signals S1 are canceled by each other. The output signals y1 and y2 each indicate a value twice as much as that of signals S1 and S2, respectively, as a result of the maximum ratio combining on the two signal paths. This indicates that a diversity gain of 3 dB is obtained.

The above-described propagation paths 109 and 110 will be further described below. Each of the transmitters 105 and 106 is provided with a band-pass filter for limiting the output frequency band. The pass band width of the band-pass filter is limited by the rules of radio waves available. The present invention essentially performs phase multiplexing, as described above. Therefore, although it is preferred that one is allowed to use a band-pass filter having a pass band width that is greater than that of the band-pass filter provided in the transmitters 302 and 303 of the conventional device described above with reference to FIG. 6, even if the available pass band width is only as much as that available with the conventional device, an extra room in the transmission capacity of the propagation path is already provided by the phase multiplexing. Such an extra capacity can be used for diversity effects.

Second Embodiment

Figure 3:
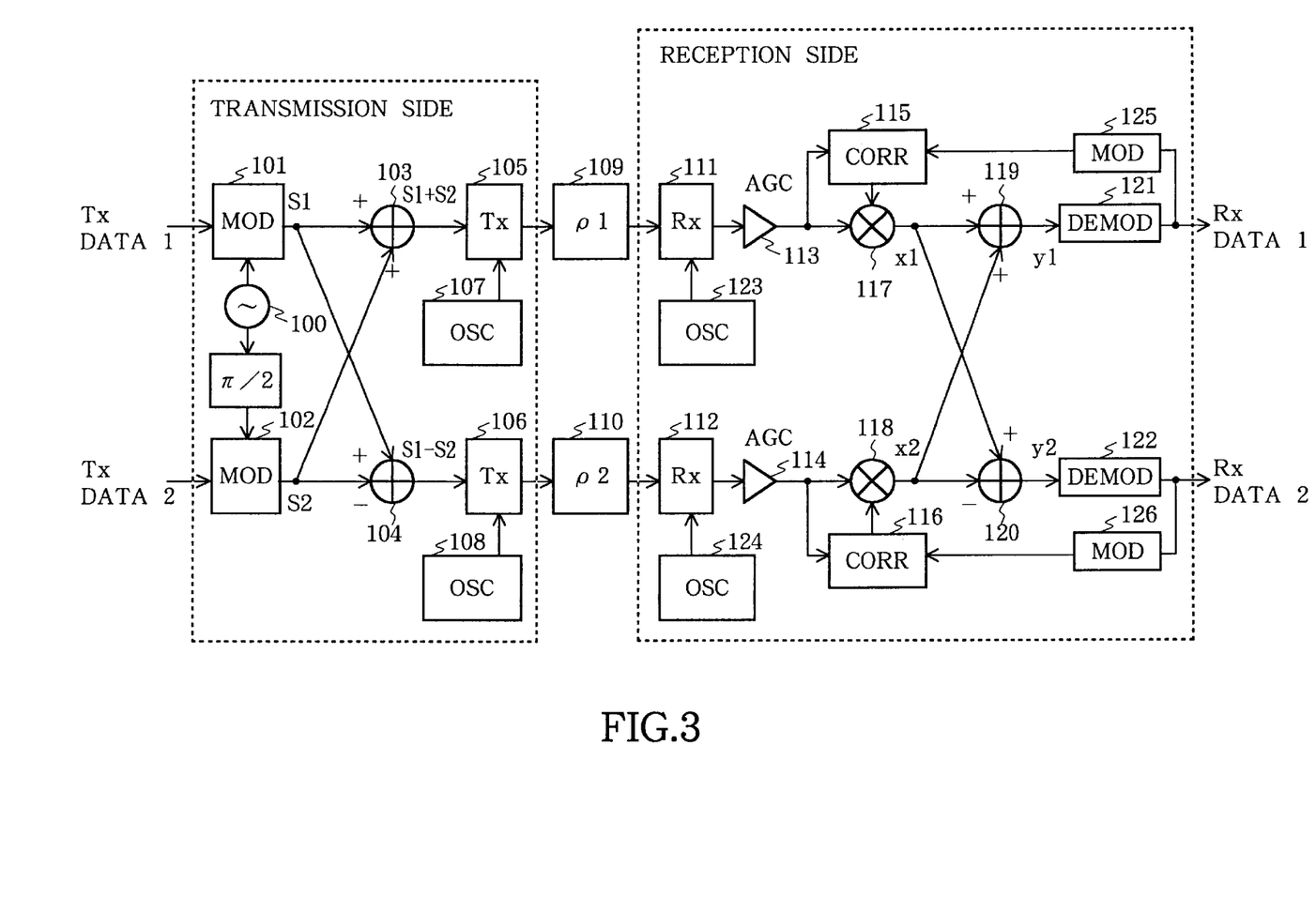
FIG. 3 is a block diagram illustrating the second embodiment of the present invention.

Next, the second embodiment of the present invention will be described with reference to FIG. 3. FIG. 3 is a diagram illustrating a structure of the reception side according to the second embodiment of the present invention. The structure of the present embodiment is different from that of the first embodiment illustrated in FIG. 1 as follows. In the first embodiment, the input signals to the correlation control circuits 115 and 116 of the respective diversity branches are taken from the adder 119 and the subtracter 120, respectively. In contrast, in the present embodiment, data which have been demodulated by the demodulators 121 and 122 are re-modulated by modulators 125 and 126, and then input to the correlation control circuits 115 and 116, respectively.

The operation of the embodiment illustrated in FIG. 3 will now be described. The operation of the present embodiment is different from that of the first embodiment as follows. In the first embodiment, the output from the adder 119 is used as a reference signal for the correlation control operation. In the present embodiment, for the branch 1, for example, the determination data signal from the demodulator 121 is re-modulated by the modulator 125, and the re-modulated signal is fed back to the correlation control circuit 115.

In the first embodiment illustrated in FIG. 1, the correlation operation for the branch 1 is expressed by the following expression:

$$W1=E[conj\{(\rho1/|\rho1|)\cdot(S1+S2)\}\cdot S1]=(\rho1^*/|\rho2|)conj\{S1\}\cdot S1 =\rho1^*/|\rho1|$$

Herein, on the right side of the first line of this expression, the term "conj(S1+S2)" is the reception signal from the automatic gain controller 113, and is the result of the summation of the signals for the branches 1 and 2 on the transmission side. On the other hand, S1 which is multiplied to "conj(S1+S2)" corresponds to S1 contained in the output y1 from the adder 119. Particularly, when the weighting coefficient for the multiplier 117 converges into $$W1=\rho1^*/|\rho1|$$

as in the above expression, only S1 will be output to y1. However, S1 is a transmission signal for the branch 1, and should be demodulated by the demodulator 121. Thus, if the demodulator 121 is giving a correct data determination, the reception data 1 matches with the transmission data 1. Re-modulating this by the modulator 125 illustrated in FIG. 3 is equivalent to reproducing the transmission signal S1. Therefore, if this is fed back to the correlation control circuit 115 as an input thereto, instead of the output y1 from the adder 119, it is possible to calculate the correlation coefficient W1 described above. A similar operation can be performed also for the branch 2 by re-modulating the reception data 2 from the demodulator 122 by the modulator 126 and inputting the re-modulated signal to the correlation control circuit 116.

In comparison to the first embodiment, the second embodiment provides an advantage in that the weighting coefficients W1 and W2 can be accurately obtained. In the first embodiment, the sum of the respective reception signals from the branches 1 and 2 (i.e., the output from the adder 119) and the difference therebetween (i.e., the output from the subtracter 120) are fed back to the correlation control circuits 115 and 116, respectively. However, these signals contain receiver noise, though in a slight amount. In contrast, in the second embodiment, the reception signal is subjected to a data determination process by way of threshold determination, or the like, at the demodulator 121. Therefore, data thereafter no longer contains receiver noise. Assuming that there is no bit error, the determination data is exactly the same as the original data from the transmission side. Therefore, by re-modulating such data by the modulator 125, it is possible to obtain a 'clean' replica S1 of the transmission signal from which noise has been eliminated. Thus, the reference signal S1 for the correlation control circuit 115 does not contain noise in the present embodiment in contrast to that used in the first embodiment, whereby it is possible to perform an accurate correlation operation, and the resulting weighting coefficient comes closer to the correct value as compared to that used in the first embodiment.

Third Embodiment

Next, the third embodiment of the present invention will be described with reference to FIG. 4. The third embodiment is characterized in that known preamble signals corresponding to the transmission signals are used as the input signals to the correlation control circuits 115 and 116 of the respective diversity branches, rather than taking the input signals from the adder 119 and the subtracter 120, respectively.

Figure 4:
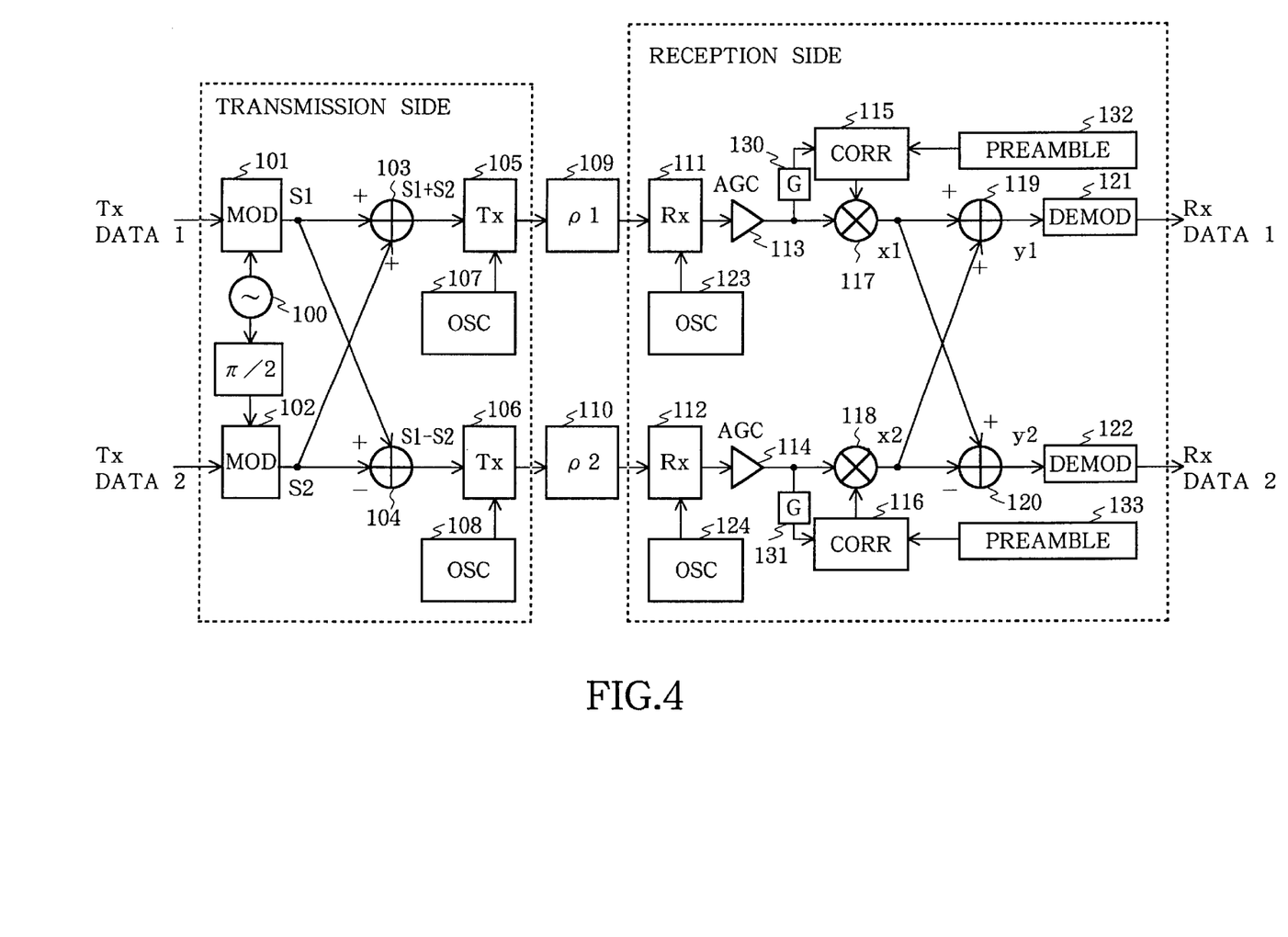
FIG. 4 is a block diagram illustrating the third embodiment of the present invention.

The structure of the third embodiment illustrated in FIG. 4 is different from that of the first embodiment in that the former includes gate circuits 130 and 131 provided between the automatic gain controllers 113 and 114 and the correlation control circuits 115 and 116, respectively, and that it includes preamble signal generation circuits 132 and 133 for providing reference signals to the correlation control circuits 115 and 116, respectively. The preamble signal generation circuits 132 and 133 generate known transmission preamble signals and provide the preamble signals to the correlation control circuits 115 and 116 of the respective branches. A ROM can be used as the preamble signal generation circuit for generating a preamble signal. In fact, a preamble signal generation circuit which is provided in a reception control circuit for synchronization control of reception signals, etc., can be used.

The operation of the third embodiment will be described. It is typical for data radio communications to employ a radio packet system in which a preamble signal is attached at the head of a transmitted signal. The timing at which the preamble signal appears is also known to the reception side. Therefore, by performing a correlation operation with respect to a reception signal using the preamble signal, it is possible to perform a more accurate correlation operation.

In the third embodiment, it is not the output from the adder 119 that is used as the reference signal for the correlation control operation. For the branch 1, for example, a preamble signal 1 which is output from the preamble signal generation circuit 132 provided on the reception side of the branch 1 is fed back to the correlation control circuit 115. In order to perform the correlation operation based on the preamble signal, the gate circuit 130 is provided for separating and extracting the transmission preamble signal from the output of the automatic gain controller 113. Since the timing at which the preamble signal appears is known to the reception side, the gate circuit 130 can be opened only during a time period in which the preamble signal appears, so that the reception preamble signal is input to the automatic gain controller 113.

The third embodiment uses a known preamble signal, which does not contain noise, whereby it is possible to perform an accurate correlation operation, and the resulting weighting coefficient comes closer to the correct value. In contrast, the second embodiment uses determination data. Therefore, in regions where the C/N value is poor, a bit error is likely to occur, and the signal obtained by re-modulating the determination data may not always completely match with the transmission side replica signal, which may sometimes lead to some error in the correlation operation result at the correlation control circuit 115. On the contrary, the third embodiment uses a known preamble signal as the reference signal, thereby providing an advantage in that it is possible to obtain a reference signal for a correct correlation without being influenced by C/N deterioration which may occur during propagation.

Fourth Embodiment

It has not been discussed in any of the above-described embodiments what type of transmission/reception control should be performed in the case where the conditions of one of the propagation paths have deteriorated to a point where the transmitted signal cannot be received by the reception side. The fourth embodiment is directed to a structure in which the reception side can cause the transmission side to change the protocol used for diversity transmission in the case where the reception level along one of the propagation paths has faded out.

With the structures of the first to third embodiments, if the reception level along one of the branches has decreased and faded out, it is no longer possible to restore both of the transmission signals S1 and S2. Referring again to FIG. 2, in the above-described embodiments, the transmission side produces the combined signal S1+S2 for the branch 1 and the combined signal S1−S2 for the branch 2. On the reception side, these signals are subjected to a linear combining operation by the adder 119 or the subtracter 120 so as to obtain diversity-combined signals of 2S1 and 2S2 as the outputs for the respective branches. If the reception signal level for one of the branches, e.g., the branch 2, has decreased to a point where the reception signal cannot be normalized by the automatic gain controller 114, the signal from the branch 1 passes through the adder 119 with no alteration thereto, whereby the signal component S2 from the branch 1 cannot be eliminated in the adder 119. This is equivalent to the reception signal S1 from the branch 1 being interfered with S2, thereby resulting in a situation where the signal cannot be reproduced in a subsequent demodulation circuit.

In the fourth embodiment, the reception signal levels for both branches are monitored. When the reception level of one branch decreases to or below a threshold value, the transmission side is controlled so that the operation of producing S1+S2 and S1−S2 is not performed on the transmission side. Thus, it is possible to address situations where the transmitted signal cannot be demodulated on the reception side. For example, variations in the conditions of a radio wave propagation path due to a change in weather, or the like, is not so abrupt that the momentary signal failure occurs. Therefore, such variations in the conditions of a radio wave propagation path can be addressed by such monitoring of the reception signal level of each branch.

Figure 5:
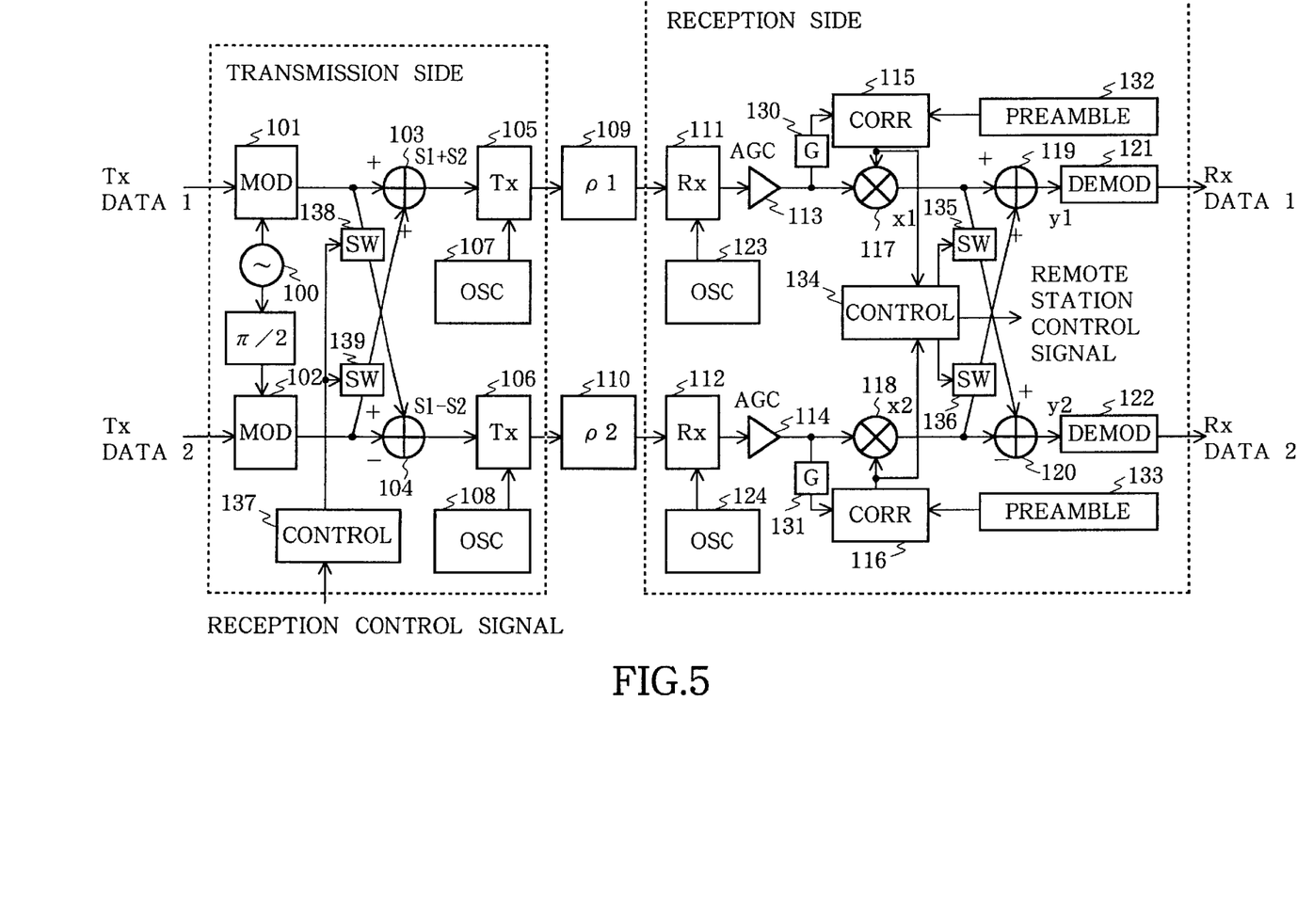
FIG. 5 is a block diagram illustrating the fourth embodiment of the present invention.

In the fourth embodiment, the transmission side includes a control circuit 137 for receiving a control signal from the reception side, a switch circuit 138 inserted in the path from the modulator 101 to the subtracter 104, and another switch circuit 139 inserted in the path from the modulator 102 to the adder 103. The reception side includes the gate circuit 130 and the preamble signal generation circuit 132 for the branch 1 and the gate circuit 131 and the preamble signal generation circuit 133 for the branch 2. The reception side further includes a control circuit 134 which receives the respective outputs from the correlation control circuits 115 and 116, a switch circuit 135 inserted in the path from the multiplier 117 to the subtracter 120, and another switch circuit 136 inserted in the path from the multiplier 118 to the adder 119. The output from the control circuit 134 is input to the switch circuits 135 and 136. The control circuit 134 transmits a control signal to the control circuit 137 on the transmission side.

The control circuit 134 uses the respective correlation results output from the correlation control circuits 115 and 116 for monitoring the reception signal levels. Each of the correlation values is obtained from a correlation operation between a complex conjugate of a reception signal and a preamble signal as a reference signal. Therefore, when the reception signal level for a branch decreases, the correlation value also decreases accordingly. When the reception signal from the branch fades out, the correlation value becomes zero. Thus, the control circuit 134 monitors the correlation values for the respective branches 1 and 2, so that when these correlation values decrease to or below a given threshold value, the switch circuits 135 and 136 on the reception side are controlled so as to block any signal passing therethrough. In such a case, the control circuit 134 outputs a remote station control signal to the remote station. The control signal is transmitted to the remote station after it is multiplexed in a time division manner with the transmission signal in the local station. Then, in the remote station, the switch circuits 138 and 139 are controlled by the control circuit 137 so as to block any signal passing therethrough. Thus, the adder 103 and the subtracter 104 on the transmission side merely allow signals of the respective branches to pass therethrough, rather than performing the addition and subtraction operations. As a result, only S1 is transmitted over the branch 1 and only S2 is transmitted over the branch 2.

Thus, even when the reception signal level of one branch decreases, a normal diversity transmission is performed, thereby avoiding situations where neither of the signals can be restored.

The monitoring of the radio wave propagation path can be done by any other method. Any reception signal level monitoring method which has been used in the prior art, such as monitoring the field strength of the reception signal, can be used.

As described above, according to the present invention, it is possible to increase, by a factor of up to two, the transmission capacity as compared with the conventional example where a diversity transmission is performed by transmitting two signals of the same information over two radio wave propagation paths. Moreover, a diversity combining operation based on maximum ratio combining can be performed in the reception side device. According to the present invention, it is possible to improve the efficiency of use of radio wave resources and hardware resources. Furthermore, according to the present invention, it is possible to increase the transmission capacity for interoffice or inter-building radio communications.

What is claimed is:

1. A diversity transmission/reception method, comprising the steps of:
   receiving two transmission signals (S1 and S2) independent of each other;
   combining the two transmission signals to produce two combined signals through addition and subtraction, respectively;
   transmitting the combined signals over two propagation paths, respectively;
   receiving the signals which have been transmitted over the two propagation paths, respectively; and
   restoring the two transmission signals.

2. A diversity transmission/reception device, comprising:
   a transmission side device for receiving two transmission signals independent of each other, combining the two transmission signals to produce two combined signals through addition and subtraction, respectively, and transmitting the combined signals over two propagation paths, respectively;
   and a reception side device for receiving the signals which have passed through the two propagation paths, respectively, and extracting the two transmission signals by eliminating one of the transmission signals from one of the combined signals and by eliminating the other one of the transmission signals from the other one of the combined signals, respectively.

3. A diversity transmission/reception device according to claim 2, the transmission side device comprising:
   modulation means for modulating the transmission signals using carrier waves of the same frequency so that one of the transmission signals has a phase which is shifted by $\pi/2$ from that of the other one of the transmission signals;
   means for adding the two modulated signals together;
   means for transmitting the signal obtained through the addition as a first reception signal;
   means for subtracting one of the two modulated signals from the other one of the two modulated signals; and
   means for transmitting the signal obtained through the subtraction as a second reception signal, and the reception side device comprising:
   first amplification means for amplifying the first reception signal;
   second amplification means for amplifying the second reception signal;
   first multiplication means for multiplying a given weighting coefficient to an output from the first amplification means;
   second multiplication means for multiplying a given weighting coefficient to an output from the second amplification means;
   means for adding together respective outputs from the first multiplication means and the second multiplication means;

means for subtracting the output from one of the first and second multiplication means from the output from the other one of the first and second multiplication means;

first correlation control means for performing a correlation operation between an output from the addition means and the output from the first amplification means so as to provide a weighting coefficient to the first multiplication means; and second correlation control means for performing a correlation operation between an output from the subtraction means and the output from the second amplification means so as to provide a weighting coefficient to the second multiplication means.

4. A diversity transmission/reception device according to claim 2, the transmission side device comprising:

modulation means for modulating the transmission signals using carrier waves of the same frequency so that one of the transmission signals has a phase which is shifted by $\pi/2$ from that of the other one of the transmission signals;

means for adding the two modulated signals together;

means for transmitting the signal obtained through the addition as a first reception signal;

means for subtracting one of the two modulated signals from the other one of the two modulated signals; and means for transmitting the signal obtained through the subtraction as a second reception signal, and the reception side device comprising:

first amplification means for amplifying the first reception signal;

second amplification means for amplifying the second reception signal;

first multiplication means for multiplying a given weighting coefficient to an output from the first amplification means;

second multiplication means for multiplying a given weighting coefficient to an output from the second amplification means;

means for adding together respective outputs from the first multiplication means and the second multiplication means;

means for subtracting the output from one of the first and second multiplication means from the output from the other one of the first and second multiplication means;

first re-modulation means for re-modulating a demodulated signal obtained by demodulation of the first reception signal and inputting the re-modulated signal, instead of the output from the addition means, to the first correlation control means; and second re-modulation means for re-modulating a demodulated signal obtained by demodulation of the second reception signal and inputting the re-modulated signal, instead of the output from the subtraction means, to the second correlation control means.

5. A diversity transmission/reception device according to claim 2, the transmission side device comprising:

modulation means for modulating the transmission signals using carrier waves of the same frequency so that one of the transmission signals has a phase which is shifted by $\pi/2$ from that of the other one of the transmission signals;

means for adding the two modulated signals together;

means for transmitting the signal obtained through the addition as a first reception signal;

means for subtracting one of the two modulated signals from the other one of the two modulated signals; and means for transmitting the signal obtained through the subtraction as a second reception signal, and the reception side device comprising:

first amplification means for amplifying the first reception signal;

second amplification means for amplifying the second reception signal;

first multiplication means for multiplying a given weighting coefficient to an output from the first amplification means;

second multiplication means for multiplying a given weighting coefficient to an output from the second amplification means;

means for adding together respective outputs from the first multiplication means and the second multiplication means;

means for subtracting the output from one of the first and second multiplication means from the output from the other one of the first and second multiplication means;

first preamble generation means for generating a first preamble signal and inputting the first preamble signal, instead of the output from the addition means, to the first correlation control means;

second preamble generation means for generating a second preamble signal and inputting the second preamble signal, instead of the output from the subtraction means, to the second correlation control means;

first gate means for allowing the output from the first amplification means to be input to the first correlation means at a timing at which the first preamble signal appears to the first reception signal; and second gate means for allowing the output from the second amplification means to be input to the second correlation means at a timing at which the second preamble signal appears to the second reception signal.

6. A diversity transmission/reception device according to claim 2, comprising:

means for monitoring characteristics of the propagation paths; and means for, when a quality of at least one of the propagation paths degrades, stopping the signal combining operation on the transmission side.

7. A diversity transmission/reception device according to claim 6, wherein the monitoring means is means which detects a decrease in a reception signal level to or below a predetermined value based on at least one of the outputs from a first and second correlation control means.

8. A diversity transmission/reception device, comprising a transmission side device and a reception side device, the transmission side device comprising:

addition means for receiving two transmission signals (S1 and S2) independent of each other to produce an output signal (S1+S2);

subtraction means for receiving the two transmission signals (S1 and S2) independent of each other to produce an output signal (S1−S2);

first transmission means for diversity-transmitting the output signal (S1+S2) from the addition means to a first propagation path as a first reception signal; and second transmission means for diversity-transmitting the output signal (S1−S2) from the subtraction means to a second propagation path as a second reception signal, and the reception side device comprising:
  first and second reception means for receiving the first and second reception signals which have passed through the first and second propagation paths, respectively;
  first and second automatic gain controlling means for receiving, as their inputs, the outputs from the first and second reception means, respectively;
  first and second multiplication means for subjecting the output signals from the first and second automatic gain controlling means to complex multiplication with weighting coefficients (W1 and W2) so as to produce output signals (x1 and x2), respectively;
  addition means and subtraction means receiving, as their inputs, the output signals (x1 and x2) from the first and second multiplication means so as to produce outputs (y1=x1+x2) and (y2=x1−x2), respectively;
  first correlation control means for performing a correlation operation between a first input and a second input, the first input being the output (y1=x1+x2) from the addition means and the second input being the output from the first automatic gain controlling means, so as to provide the weighting coefficient (W1) to the first multiplication means; and
  second correlation control means for performing a correlation operation between a first input and a second input, the first input being the output (y2=x1−x2) from the subtraction means and the second input being the output from the second automatic gain controlling means, so as to provide the weighting coefficient (W2) to the second multiplication means.

9. A diversity transmission/reception device according to claim 8, wherein the two transmission signals (S1 and S2) independent of each other are signals which are obtained by modulating carrier waves of the same frequency whose phases are shifted from each other by about $\pi/2$.

10. A diversity transmission/reception device according to claim 8, wherein:
  the first and second correlation control means comprise means for calculating the weighting coefficients (W1 and W2), respectively, so that each of the output (y1) from the addition means and the output (y2) from the subtraction means of the reception side device has an amplitude that is in proportion to the square of a respective one of the first and second reception signals and is in phase with the respective one of the first and second reception signals.

11. A diversity transmission/reception device according to claim 10, wherein:
  gains of the first and second automatic gain controlling means are in proportion to $1/|\rho 1|$ and $1/|\rho 2|$, respectively (where $\rho 1$ and $\rho 2$, each being a complex number, denote transmission coefficients of the first and second propagation paths, respectively); and
  the weighting coefficients (W1 and W2) are $W1=k1\rho 1^*/|\rho 1|$ and $W2=k2\rho 2^*/|\rho 2|$, respectively (where k1 and k2 denote proportional constants, and $\rho 1^*$ and $\rho 2^*$ denote complex conjugates of $\rho 1$ and $\rho 2$, respectively).

12. A diversity transmission/reception device according to claim 8, comprising means for monitoring a signal level of each of the first and second reception signals and for, when the signal level of at least one of the first and second reception signals decreases to or below a predetermined value, stopping the signal combining operation on the transmission side.

13. A diversity transmission/reception device comprising a transmission side device and a reception side device, the transmission side device comprising:
  addition means for receiving two transmission signals (S1 and S2) independent of each other to produce an output signal (S1+S2);
  subtraction means for receiving the two transmission signals (S1 and S2) independent of each other to produce an output signal (S1−S2);
  first transmission means for diversity-transmitting the output signal (S1+S2) from the addition means to a first propagation path as a first reception signal; and
  second transmission means for diversity-transmitting the output signal (S1−S2) from the subtraction means to a second propagation path as a second reception signal, and the reception side device comprising:
  first and second reception means for receiving the first and second reception signals which have passed through the first and second propagation paths, respectively;
  first and second automatic gain controlling means for receiving, as their inputs, the outputs from the first and second reception means, respectively;
  first and second multiplication means for subjecting the output signals from the first and second automatic gain controlling means to complex multiplication with weighting coefficients (W1 and W2) so as to produce output signals (x1 and x2), respectively;
  addition means and subtraction means receiving, as their inputs, the output signals (x1 and x2) from the first and second multiplication means so as to produce outputs (y1=x1+x2) and (y2=x1−x2), respectively;
  a first modulator for re-modulating the first reception signal which has been demodulated and providing the re-modulated signal, instead of the output from the addition means, to the first correlation control means; and
  a second modulator for re-modulating the second reception signal which has been demodulated and providing the re-modulated signal, instead of the output from the subtraction means, to the second correlation control means.

14. A diversity transmission/reception device comprising a transmission side device and a reception side device, the transmission side device comprising:
  addition means for receiving two transmission signals (S1 and S2) independent of each other to produce an output signal (S1+S2);
  subtraction means for receiving the two transmission signals (S1 and S2) independent of each other to produce an output signal (S1−S2);
  first transmission means for diversity-transmitting the output signal (S1+S2) from the addition means to a first propagation path as a first reception signal; and
  second transmission means for diversity-transmitting the output signal (S1−S2) from the subtraction means to a second propagation path as a second reception signal, and the reception side device comprising:
  first and second reception means for receiving the first and second reception signals which have passed through the first and second propagation paths, respectively;
  first and second automatic gain controlling means for receiving, as their inputs, the outputs from the first and second reception means, respectively;

first and second multiplication means for subjecting the output signals from the first and second automatic gain controlling means to complex multiplication with weighting coefficients (W1 and W2) so as to produce output signals (x1 and x2), respectively;

addition means and subtraction means receiving, as their inputs, the output signals (x1 and x2) from the first and second multiplication means so as to produce outputs (y1=x1+x2) and (y2=x1−x2), respectively;

first preamble generation means for generating a first preamble signal and inputting the first preamble signal, instead of the output from the addition means, to the first correlation control means as a reference signal;

second preamble generation means for generating a second preamble signal and inputting the second preamble signal, instead of the output from the subtraction means, to the second correlation control means as a reference signal;

first gate means for allowing the output from the first automatic gain controlling means to pass therethrough so as to be input to the first correlation means at a timing at which the first preamble signal appears to the first reception signal; and second gate means for allowing the output from the second automatic gain controlling means to pass therethrough so as to be input to the second correlation means at a timing at which the second preamble signal appears to the second reception signal.

* * * * *